US012684207B2

(12) United States Patent
Yepez

(10) Patent No.: US 12,684,207 B2
(45) Date of Patent: Jul. 14, 2026

(54) OPEN FRAME CAMERA SUPPORT ASSEMBLY FOR SELF-SERVICE CHECKOUT TERMINALS

(71) Applicant: NCR Voyix Corporation, Atlanta, GA (US)

(72) Inventor: Rafael Yepez, Duluth, GA (US)

(73) Assignee: NCR Voyix Corporation, Atlanta, GA (US)

( * ) Notice: Subject to any disclaimer, the term of this patent is extended or adjusted under 35 U.S.C. 154(b) by 300 days.

(21) Appl. No.: 18/215,518

(22) Filed: Jun. 28, 2023

(65) Prior Publication Data

US 2023/0345093 A1 Oct. 26, 2023

Related U.S. Application Data

(63) Continuation-in-part of application No. 29/852,860, filed on Sep. 9, 2022, now Pat. No. Des. 1,063,920,
(Continued)

(51) Int. Cl.
*H04N 23/50* (2023.01)
*G07G 1/00* (2006.01)
*H04N 23/90* (2023.01)

(52) U.S. Cl.
CPC ........... *H04N 23/50* (2023.01); *G07G 1/0018* (2013.01); *H04N 23/90* (2023.01)

(58) Field of Classification Search
CPC ...... H04N 23/50; H04N 23/90; G07G 1/0018; G07G 1/0036; G07G 1/0045; G07G 1/01;
(Continued)

(56) References Cited

U.S. PATENT DOCUMENTS 4,358,189 A * 11/1982 Nylander ............... G01C 11/02
396/428
5,115,888 A * 5/1992 Schneider ........... G06Q 20/208
235/383
(Continued)

OTHER PUBLICATIONS

Extended European Search Report for corresponding European Patent Application No. 24185154.2 dated Oct. 25, 2024.
(Continued)

*Primary Examiner* — Chiawei Chen
(74) *Attorney, Agent, or Firm* — Notaro, Michalos & Zaccaria P.C.

(57) ABSTRACT

A camera support assembly may include an open frame mounted on a bracket coupled to self-service checkout terminal, the open frame above a scan area surface of the self-service checkout terminal, the open frame being trapezoidal and having two opposing parallel sides, the bracket connected to the open frame on a first side of the two opposing parallel sides. In addition, the assembly may include a cross-member connecting the two opposing parallel sides of the open frame. The assembly may include a first camera mounted on the cross-member, the first camera positioned downward facing towards the scan area surface of the self-service checkout terminal, the first camera coupled to a computer-vision item transaction module of the self-service checkout terminal.

20 Claims, 13 Drawing Sheets

Related U.S. Application Data and a continuation-in-part of application No. 17/902, 105, filed on Sep. 2, 2022.

(60) Provisional application No. 63/240,599, filed on Sep. 3, 2021.

(58) Field of Classification Search
CPC ...... G06Q 20/18; G06Q 20/20; G06Q 20/204; G06Q 20/208
See application file for complete search history.

(56) References Cited

U.S. PATENT DOCUMENTS

| | | | | |
|---|---|---|---|---|
| 9,207,518 | B2 * | 12/2015 | Mueller | F16M 11/18 |
| D828,348 | S | 9/2018 | Lee et al. | |
| 11,037,124 | B1 * | 6/2021 | Hsieh | G06Q 20/202 |
| 11,538,188 | B1 * | 12/2022 | Cejka | G06T 7/80 |
| 11,689,008 | B1 * | 6/2023 | Nichols | H02G 7/02 |
| | | | | 254/134.5 |
| 12,059,231 | B2 * | 8/2024 | Al Waked | A61B 5/4547 |
| 12,370,005 | B2 * | 7/2025 | Hulford | A61B 34/25 |
| 2006/0079757 | A1 * | 4/2006 | Smith | G06T 15/06 |
| | | | | 600/416 |
| 2006/0080177 | A1 * | 4/2006 | Walter | G06Q 20/20 |
| | | | | 705/16 |
| 2012/0241518 | A1 * | 9/2012 | Daily | A47F 9/047 |
| | | | | 235/383 |

| | | | | |
|---|---|---|---|---|
| 2013/0080279 | A1 * | 3/2013 | Daily | G07G 1/009 |
| | | | | 705/23 |
| 2014/0316916 | A1 * | 10/2014 | Hay | G06Q 20/20 |
| | | | | 705/17 |
| 2017/0244904 | A1 * | 8/2017 | Grossnickle | H04N 13/246 |
| 2018/0314877 | A1 * | 11/2018 | Srivastava | G06V 20/64 |
| 2019/0215422 | A1 * | 7/2019 | Bertuca | H04N 23/50 |
| 2020/0402130 | A1 * | 12/2020 | Landers, Jr. | G06Q 30/0629 |
| 2021/0035084 | A1 * | 2/2021 | Afraite-Seugnet | G07G 1/0072 |
| 2021/0232820 | A1 | 7/2021 | Hill | |
| 2021/0304173 | A1 * | 9/2021 | Rodriguez | G07G 3/003 |
| 2021/0401192 | A1 * | 12/2021 | Yang | G06V 10/40 |
| 2022/0270066 | A1 * | 8/2022 | Mousavi Gharavi | |
| | | | | G06Q 20/209 |
| 2022/0327511 | A1 * | 10/2022 | Agrawal | G06N 20/00 |
| 2022/0351592 | A1 * | 11/2022 | Cooney | G08B 5/36 |
| 2023/0039524 | A1 * | 2/2023 | Bhageria | B25J 9/0093 |
| 2023/0077198 | A1 | 3/2023 | Yepez | |
| 2023/0347525 | A1 * | 11/2023 | Bhageria | B25J 9/0093 |
| 2024/0046765 | A1 * | 2/2024 | Parvu | G07G 1/0063 |
| 2024/0372350 | A1 * | 11/2024 | Nichols | H02G 7/02 |
| 2025/0046161 | A1 * | 2/2025 | Whitelaw | G01G 19/4144 |

OTHER PUBLICATIONS

Jun. 3, 2025 Examination Report in corresponding European Patent Appl. No. 24185154.2.
Mar. 5, 2026 Examination Report in corresponding European Patent Appl. No. 24185154.2.

* cited by examiner

100D

110F

111F 121F-1

121F-2

121F-3

125F

126F

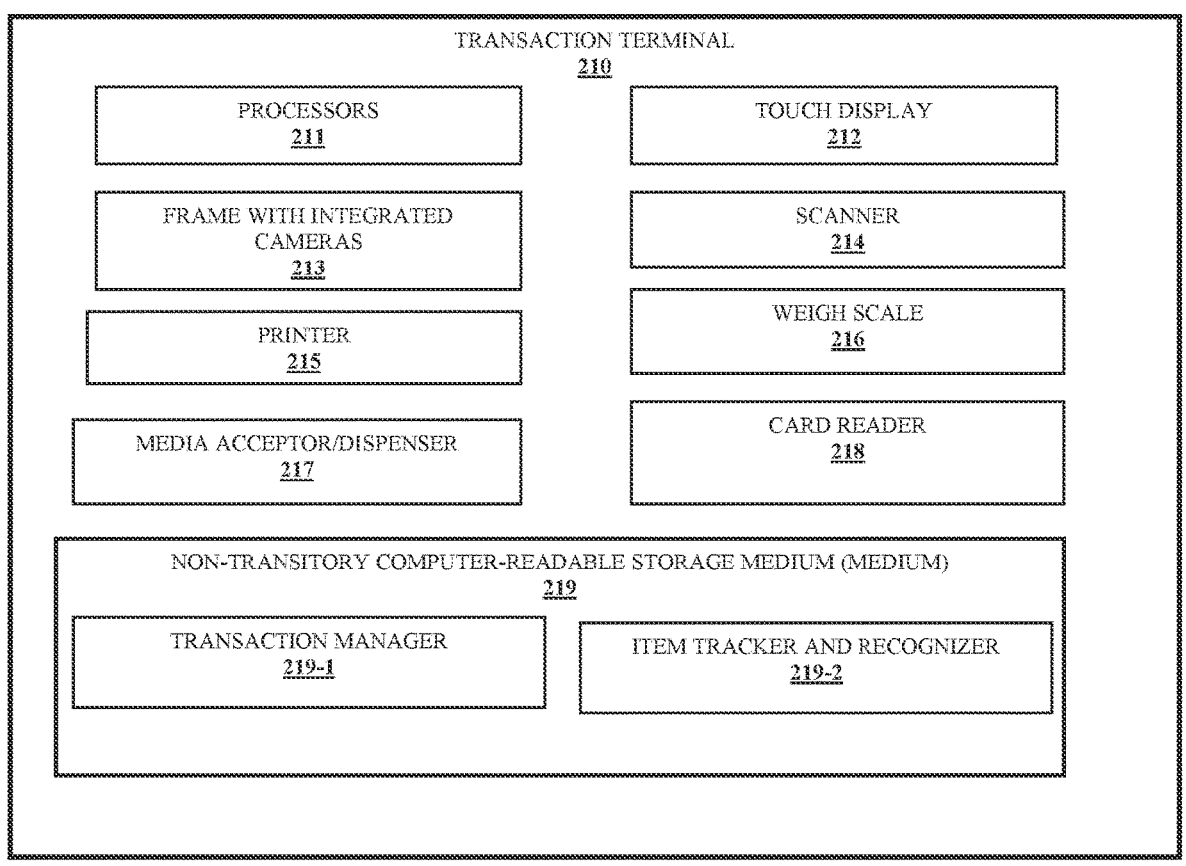
FIG. 6

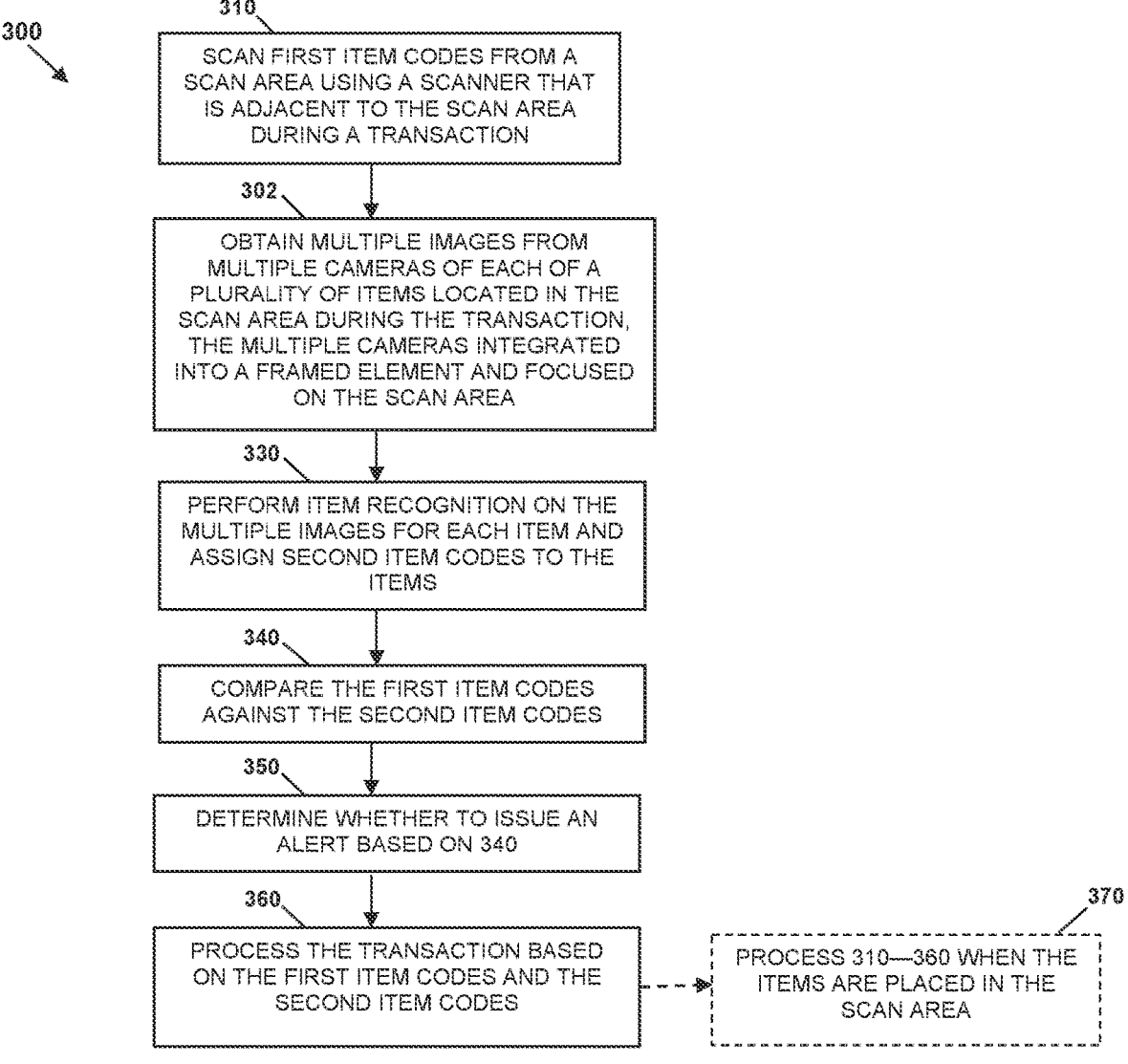

300

310
SCAN FIRST ITEM CODES FROM A
SCAN AREA USING A SCANNER THAT
IS ADJACENT TO THE SCAN AREA
DURING A TRANSACTION

302
OBTAIN MULTIPLE IMAGES FROM
MULTIPLE CAMERAS OF EACH OF A
PLURALITY OF ITEMS LOCATED IN THE
SCAN AREA DURING THE TRANSACTION,
THE MULTIPLE CAMERAS INTEGRATED
INTO A FRAMED ELEMENT AND FOCUSED
ON THE SCAN AREA

330
PERFORM ITEM RECOGNITION ON THE
MULTIPLE IMAGES FOR EACH ITEM AND
ASSIGN SECOND ITEM CODES TO THE
ITEMS

340
COMPARE THE FIRST ITEM CODES
AGAINST THE SECOND ITEM CODES

350
DETERMINE WHETHER TO ISSUE AN
ALERT BASED ON 340

360
PROCESS THE TRANSACTION BASED
ON THE FIRST ITEM CODES AND THE
SECOND ITEM CODES

370
PROCESS 310—360 WHEN THE
ITEMS ARE PLACED IN THE
SCAN AREA

FIG. 7

OPEN FRAME CAMERA SUPPORT ASSEMBLY FOR SELF-SERVICE CHECKOUT TERMINALS

CROSS-REFERENCE TO RELATED APPLICATIONS

The present application is a continuation-in-part application of U.S. patent application Ser. No. 17/902,105, filed on Sep. 2, 2022, which, in turn, claims priority to U.S. provisional patent application Ser. No. 62/240,599, filed on Sep. 3, 2021, the disclosures of which are incorporated herein by reference. The present application is also a continuation-in-part application of U.S. patent application Ser. No. 29/852,860, filed on Sep. 9, 2022, the disclosure of which is incorporated herein by reference.

FIELD

This disclosure relates generally to an open frame camera support assembly for self-service checkout terminals, and more particularly to an open frame camera support assembly which includes a plurality of cameras and lighting elements to provide improved monitoring of the associated self-service checkout terminal.

BACKGROUND

Self-checkout terminals typically rely on barcode scanning for item recognition, which can result in false reads and can require associate interventions, unnecessarily wasting a shopper's time at checkout. Because scanners are used for barcode reading, retailers often deploy other security cameras on or above the terminals to monitor checkouts and to detect customer theft.

A common type of customer theft at self-checkouts is scan avoidance, i.e., a customer intentionally not scanning an item's barcode during checkout. The industry's response to remedy this type of theft has been to add additional cameras, but this has been shown to increase response times and exacerbate delays during checkouts as security tests are being performed on captured images. Moreover, the additional cameras are intrusive and can adversely impact usability. For example, views of the customer display can be partially obstructed by these additional cameras.

Some retailers have elected to deploy a single additional security camera placed high over the transaction area above the terminal. A single camera, however, is not as reliable as multiple cameras that capture multiple different views of the transaction area. A single camera's field-of-view may not be able to capture fine-grain details of the items during checkout and portions of the transaction area may be occluded from the view (either intentionally by the customer or inadvertently) such that missing image details prevent security processes from accurately detecting theft during the checkouts.

As is evident from the above discussion, retailers struggle with theft detection during self-checkouts. Simply adding cameras around the transaction area fails to adequately account for occluded views of the items and the transaction area itself. The position and location of the cameras can also create adverse usability issues for customers. The customer's focus is often on the display, which is not adjacent to the scan area. As such, the customer may be unaware that a particular item was not properly scanned while attempting to both scan an item in the scan area and watch the display for the item price. Customers often forget which items were scanned or not scanned and have to resort to checking the display, which can be cumbersome and diminish the customer experience.

Accordingly, there is a need for an improved self-service checkout terminal that overcomes, among other things, the technical problems identified above.

BRIEF DESCRIPTION OF THE DRAWINGS

The following detailed description, given by way of example and not intended to limit the present disclosure solely thereto, will best be understood in conjunction with the accompanying drawings in which:

FIG. 6 is a diagram of a transaction terminal for item recognition, item verification, and payment functions during a transaction, according to aspects of the present disclosure.

FIG. 7 is a diagram of a method for item recognition, item verification, and payment functions during a transaction, according to aspects of the present disclosure.

DETAILED DESCRIPTION

In the present disclosure, like reference numbers refer to like elements throughout the drawings, which illustrate various exemplary embodiments of the present disclosure.

Figure 1:
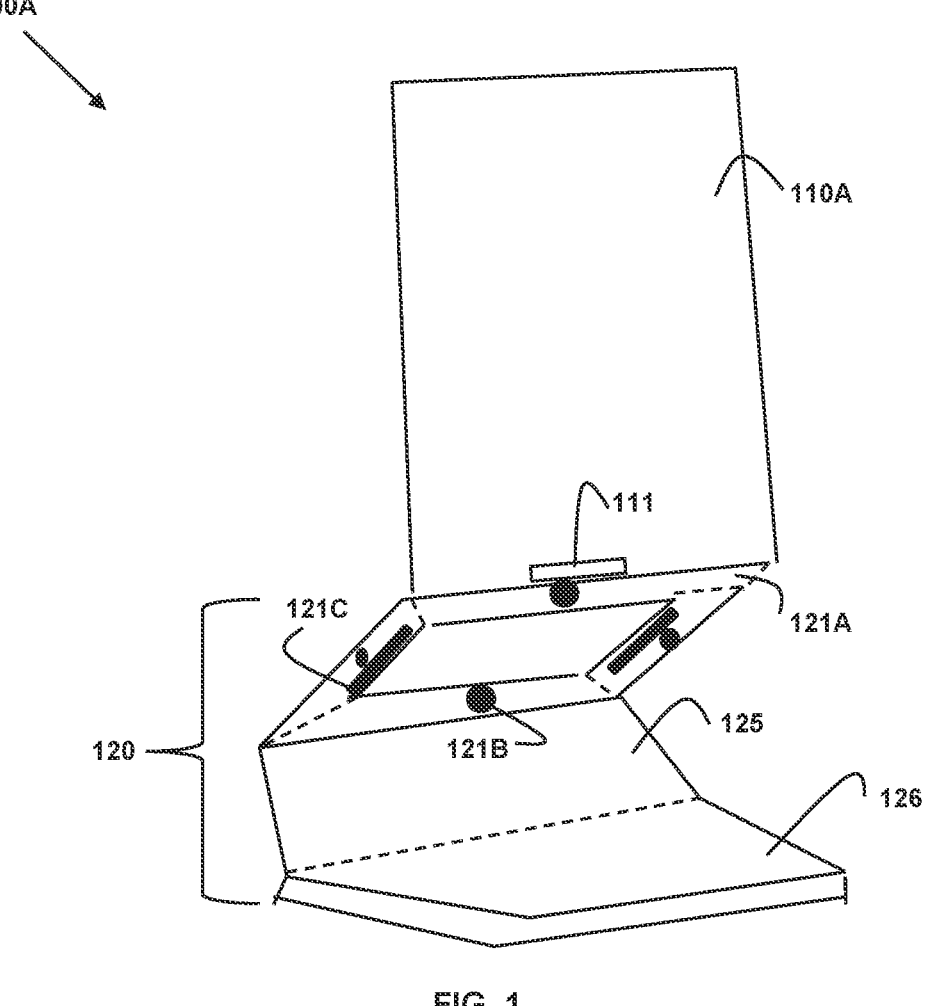
FIG. 1 is a diagram of transaction apparatus for item recognition, item verification, and payment functions during a transaction, according to one embodiment of the present disclosure.

FIG. 1 is a diagram 100A of transaction apparatus for item recognition, item verification, and payment functions during a transaction, according to an example embodiment. The apparatus includes a touch display 110A, a frame-based element 121A, at least one scanner 125, and a base 126 representing a scan area for items processed during a given transaction. It is noted that the base 126 can itself be a peripheral device such as a horizontal barcode scanner or a combination barcode scanner and weigh scale. In an embodiment, the touch display 110A includes an integrated card reader 111 in a bottom or a base of the touch display 110A.

The frame-based element 121A is angled over the base 126 or scan area, a center portion of the frame-based element 121A is hollow or an aperture (not labeled in diagram 100A). A periphery of the frame-based element 121A includes two to four separate integrated cameras 121B and at least two Light Emitting Diode (LED) strips or light sources 121C. Cameras 121B are focused on the scan area of the base 126 and are oriented nearly directly above the base 126. Each camera 121B captures images that provide different perspective views or angles of the scan area vis-a-vis the other remaining cameras 121B. In an embodiment, each camera 121B includes a wide-area lens for capturing images with enhanced detail of items placed in the scan area.

The base 126, the vertical scanner 125, and the frame-based element 121A combine to form an approximate C shape 120. The base 126 is the base of the C and represents the scan area, the vertical scanner 125 is the back of the C, and the frame-based element 121A is the top of the C. The C shape essentially surrounds items placed in the scan area or the base 126. An operator when placing items in the scan area can operate the touch display 110A as it is directly in front of the operator. The cameras 121B have an unobstructed and clear view of the scan area to capture images of the items placed in the scan area. Any exposed barcode of an item when placed in the scan area is captured by vertical scanner 125.

Scanner 125 is a vertical scanner that is adjacent to the base 126 at the bottom of the scanner window and that is adjacent to the bottom of the frame-base element 121A along a top of the scan window. Optionally, 125 and 126 form a bioptic scanner capable of scanning item bar codes vertically by vertical scanner 125 and horizontally by horizontal scanner 126. Optionally, 125 and 126 form a bioptic scanner with a built-in weigh scale, such that item weights are recorded when items are placed on the horizontal scanner 126. Optionally, base 126 is a weigh scale without any integrated horizontal scanner.

During operation of the apparatus, an operator, such as a customer who is performing a self-checkout, is guided by light sources 121C that illuminate the scan area to place items for a transaction on the base 126. At the same time, transaction interface screens are rendered directly in front of the customer on the touch display 110A, which sits above the scan area. This makes it ergonomically efficient for the customer to move items on to the base 126 and see recorded item details for the item on the touch display 110A in the transaction screens. The entire transaction area is compact and efficient. Camera 121B obtains unobstructed images of the items. Scanner 125 and/or 126 capture any detectable bar codes on the items. Non-detectable barcodes can be processed using the collected images to extract visual features, score the features, and identify the item identifiers for the corresponding items by comparing the scores to ranges of scores associated with model features of known items. Transaction data recorded by a transaction manager is then compared against the list of items identified from the images and the scanned bar codes scanned, and if a discrepancy is detected, the customer is alerted to the discrepancy through the transaction screens and/or an alert is raised to provide assistance to the customer before the transaction is permitted to complete. This ensures that theft does not take place. However, because of the arrangement of the cameras and the quality of the images, the likelihood that any discrepancies are detected is minimal since any item placed on base 126 is identified. Yet, should a customer quickly place an item on base 126 and rapidly remove it such that the item is occluded by a hand of the customer in the image, a discrepancy may be detected in this instance such that the customer is alerted via the transaction screens and/or an alert is sent to an assistant to audit the customer transaction items.

After the items are recorded in the transaction and no discrepancy is detected, the transaction screen provides a touch option for the customer to pay for the transaction. The customer may simply insert a payment card into card reader 111. In an embodiment, card reader 111 is a wireless or tap-based card reader (e.g., a reader capable of processing near-field communications (NFC) payments), a chip card reader, or a magnetic strip card reader. Card reader 111 may also be used by the customer at the start of the transaction to enter a loyalty identifier for the transaction. Alternatively or additionally, the customer can utilize the touch display to provide identifying information of a loyalty account of the customer at any point during the transaction prior to payment processing. Once payment is confirmed, the customer may bag the items purchased and exit the store.

In an embodiment, base 126 is a weigh scale that reports item weights for items placed on the weigh scale 126. Images from cameras 121B provide images of a single item or of multiple items and item recognition is performed. The item recorded weight can be checked against an expected/known item weight to determine if the item barcode that was scanned is in fact correctly associated with the item based on a comparison of the recorded item weight to an expected/known item weight for the item. Thus, the item identification can be cross-referenced against scanned barcodes and expected weights for the items as a security check to ensure that an item's barcode was not swapped out with an incorrect barcode. Furthermore, any item that is placed with other items on the weigh scale 123 and which is not identified through image item recognition and not scanned by vertical scanner 125 (e.g., an item that is intentionally occluded by the operator) can be detected by adding the weights of the recorded items together and determining that a total weight for the items is higher than what it is expected to be based on items that have been added to the transaction. Accordingly, attempts at scan avoidance by the operator can be detected in this manner.

In an embodiment, display 110A is an oversized display, for example, a 22-inch vertical display, that provides a larger touch surface area for the operator to interact with transaction options of the transaction interface. In addition, the large display 110A can present—at a bottom portion, screen, or window of the display 110—one or more of the camera feeds from cameras 121B as a live stream of the scan area. The operator can view the live feed to see the items placed in the scan area while at the same time operating the transaction interface screens situated on the display 110A above where the live feed of the scan area is presented. This ensures that the operator does not need to focus on the scan area and can instead focus directly on display 110A to see both the operator's items as well as the item information for the items as it is recorded in the transaction interface screens.

Figures 2A, 2B, 2C:
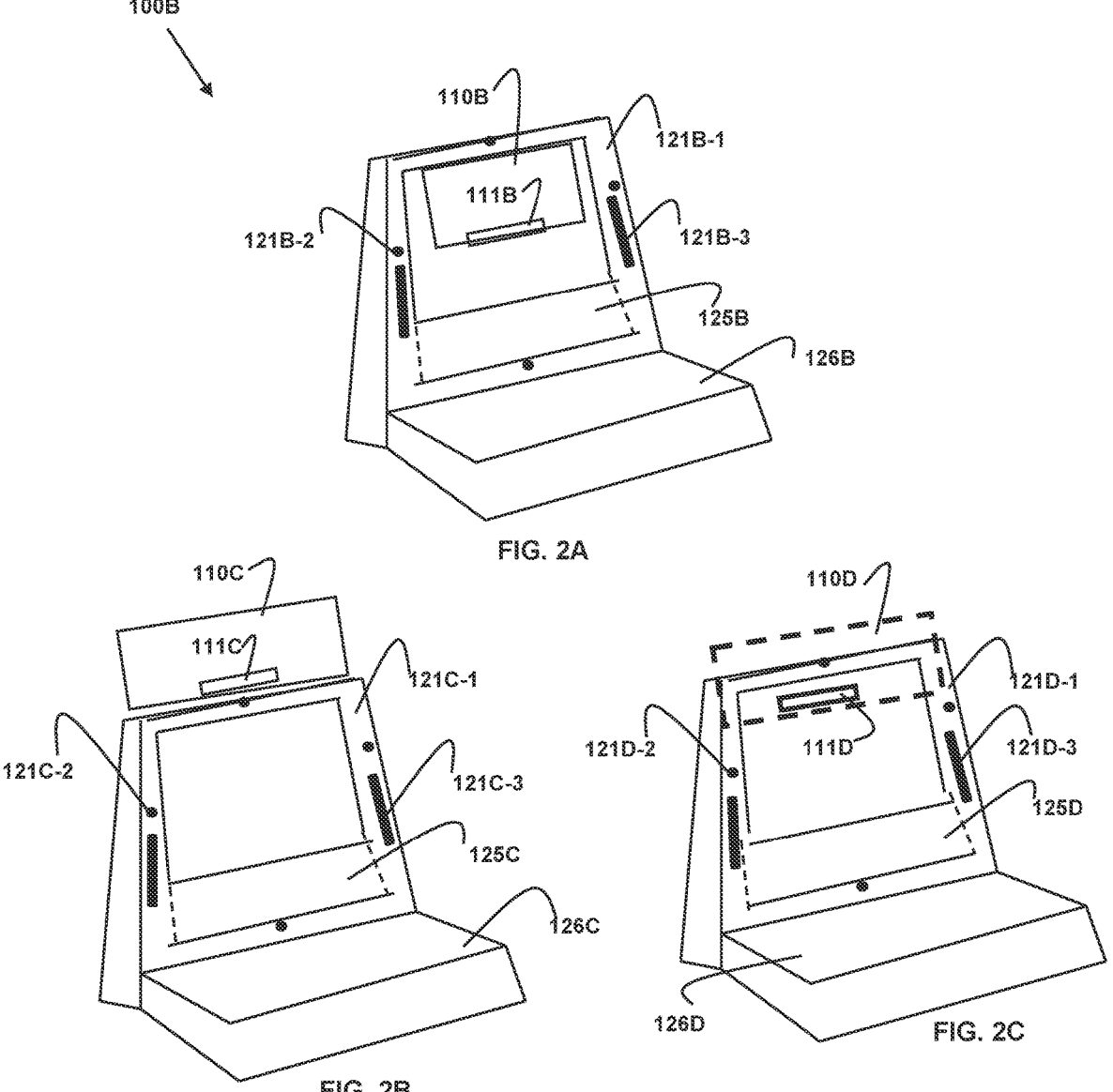
FIGS. 2A, 2B, and 2C are diagrams of transaction apparatuses for item recognition, item verification, and payment functions during a transaction, according to a second embodiment of the present disclosure.

FIG. 2A, shown with diagrams 100B, depicts an apparatus for item recognition, item verification, and payment functions during a transaction, according to an example embodiment. The arrangement of the apparatus in FIG. 2A is different from FIG. 1. In particular, touch display 110B is situated down from a top of frame-based element 121B-1 such that touch display 110B is in front of and covering the aperture of frame-based element 121B-1. Frame-based element 121B-1 is also not angled and oriented over base element 126B as is the case with the apparatus of FIG. 1. Frame-based element 121B-1 is perpendicular or substantially perpendicular to base element 126B. Similar to the apparatus of FIG. 1, the apparatus of FIG. 2A includes at least two light guidance sources 121B-3 on the frame-based element 121B-1, includes two to four cameras 121-B on the frame-based element 121B-1, includes at least one vertical scanner 125B, includes a base element 126B representing the scan area for a transaction, and includes an integrated card reader 111B at a bottom of touch display 110B.

FIG. 2B, shown with diagrams 100B, depicts an apparatus for item recognition, item verification, and payment functions during a transaction, according to another example embodiment. The arrangement of the components of the apparatus in FIG. 2B differs from the apparatus of FIG. 2A. In particular, touch display 110C sits above or on top of frame-based element 121C-1 and not within the aperture of the frame-based element 121C-1 as is the case with the apparatus in FIG. 2A. Remaining elements of the apparatus of FIG. 2B are similar to the apparatus of FIG. 2A, that is, the apparatus of FIG. 2B includes at least two light guidance sources 121C-3, includes two to four cameras 121C-2, includes a vertical scanner 125C, includes a base 126C, and touch display 110C includes at its bottom an integrated card reader 111C.

FIG. 2C, shown with diagrams 100B, is an apparatus for item recognition, item verification, and payment functions during a transaction according to another example embodiment. The arrangement of the components of the apparatus in FIG. 2C differs from from the apparatuses of FIGS. 2A and 2B. In particular, touch display 110D sits partially in front of a top portion of frame-based element 121D-1 and partially above the top portion of frame-based element 121D-1. Remaining elements of the apparatus of FIG. 2C are similar to the apparatuses of FIGS. 2A and 2B, namely, the apparatus of FIG. 2C includes at least two light guidance sources 121D-3, includes two to four cameras 121D-2, includes a vertical scanner 125D, includes a base 126D, and touch display 110D includes at its bottom an integrated card reader 111D.

Figures 3A, 3B:
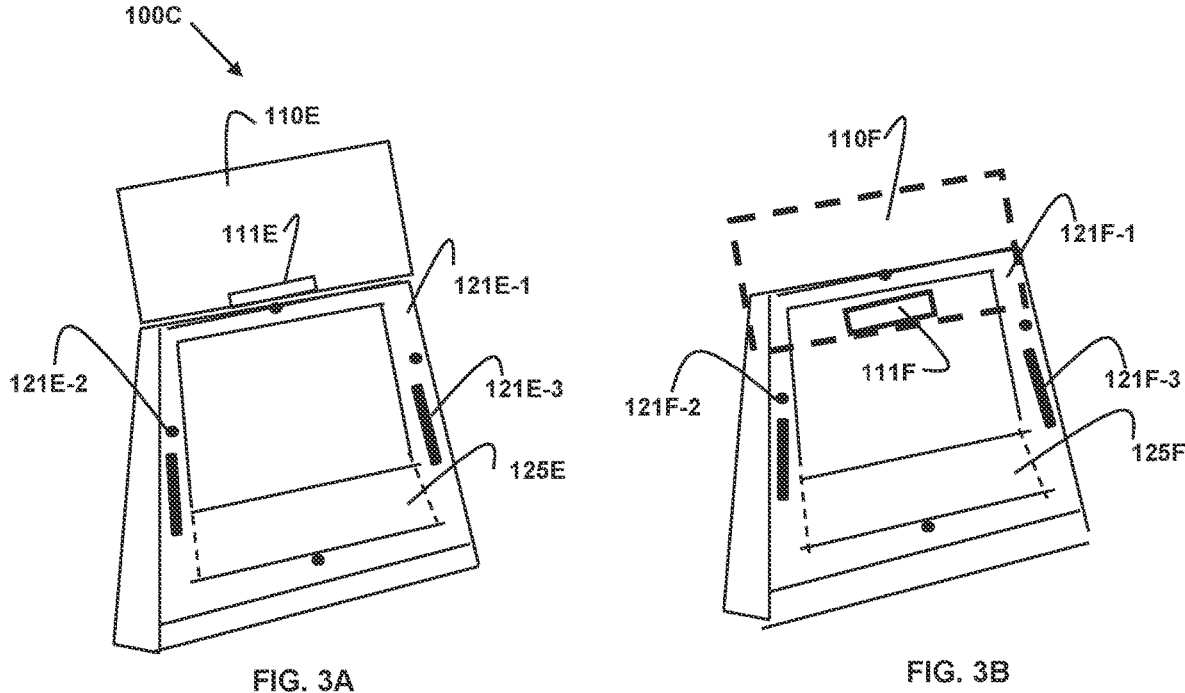
FIGS. 3A and 3B are diagrams of transaction apparatuses for item recognition, item verification, and payment functions during a transaction, according to a third embodiment of the present disclosure.

FIG. 3A, shown in the diagrams 100C, illustrates an apparatus that lacks a base. Moreover, the touch display 110E is situated on top of frame-based element 121E-1. The apparatus still includes an integrated card reader 111E at the bottom of touch display 110E, at least two light guidance sources 121E-3, two to four cameras 121E-2, and a vertical scanner 125E.

FIG. 3B, shown in the diagrams 100C, illustrates an apparatus that is similar to the apparatus of FIG. 3A but differs in that touch display 110F is situated such that it is partially above a top of frame-based element 121F-1 and partially in front of the top of frame-based element 121F-1.

The apparatus still includes an integrated card reader 111F, at least two light guidance sources 121F-2, two to four cameras 121F-3, and a vertical scanner 125F.

It is noted that although not illustrated, an apparatus may be missing a base and at the same time may include the touch display in an orientation similar to what is illustrated with the apparatus of FIG. 2A. That is, touch display 110B is suspended down in front of frame-based element 121B-1 so as to cover a portion of the aperture defined by framed-based element 121B-1. Thus, although not illustrated, an apparatus of FIG. 2A can be provided without the base element 126B.

Figure 4:
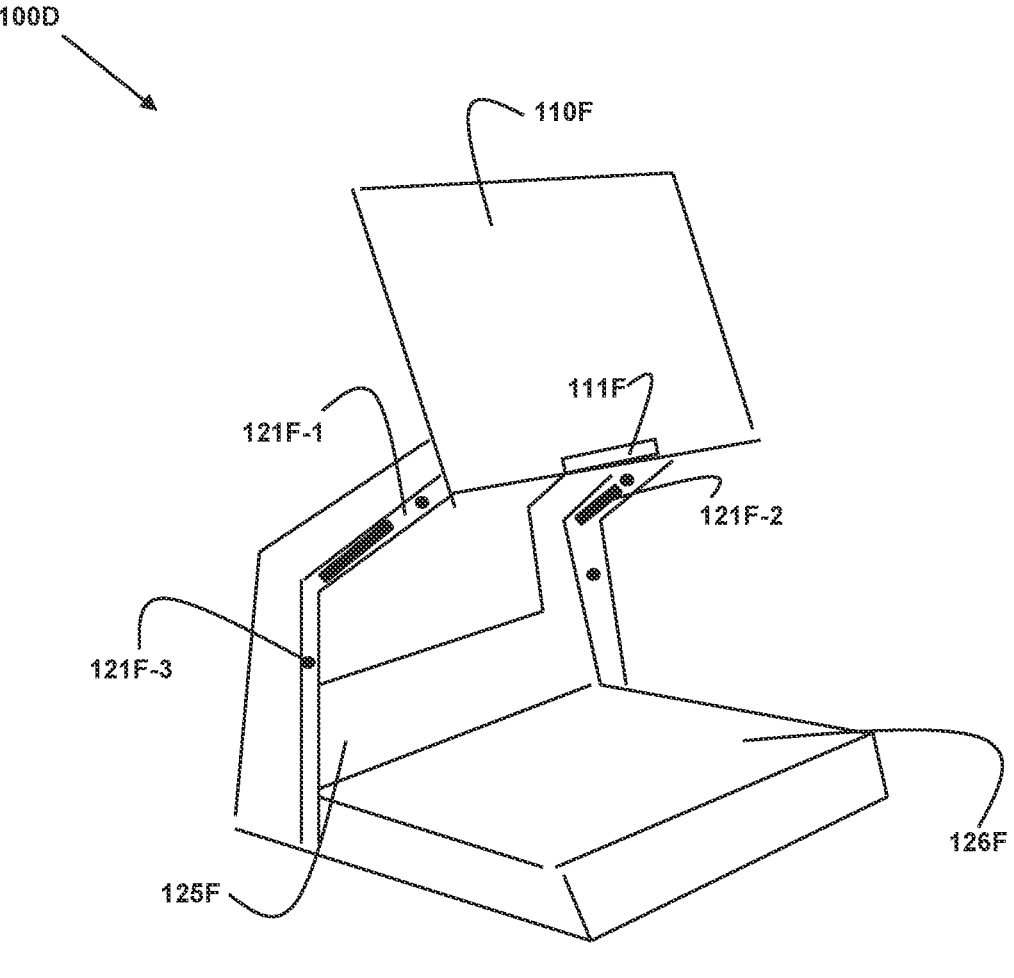
FIG. 4 is a diagram of transaction apparatus for item recognition, item verification, and payment functions during a transaction, according to a fourth embodiment of the present disclosure.

FIG. 4 is a diagram 100D illustrating an apparatus for item recognition, item verification, and payment functions during a transaction according to an example embodiment. The apparatus includes a frame-based element 121F-1 that comprises respective vertical posts adjoined to respective angled posts. A touch display 110F is affixed to respective ends of the angled posts. Again, the apparatus includes a card reader 111F integrated into a bottom of touch display 110F, at least two light guidance sources 121F-2, two to four cameras 121F-3, a vertical scanner 125F, and a base 126F.

Figure 5:
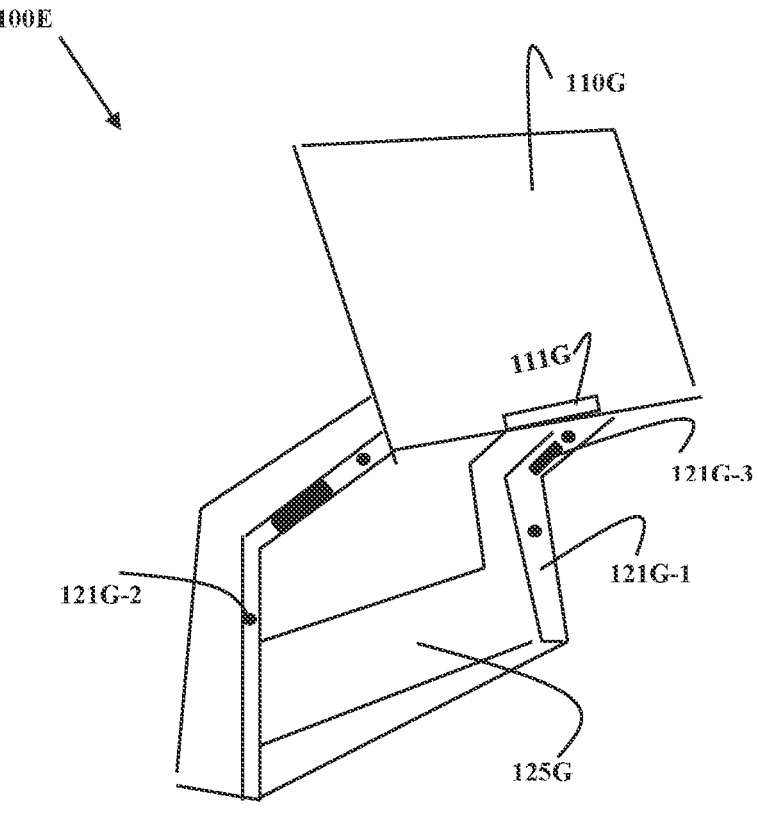
FIG. 5 is a diagram of transaction apparatus for item recognition, item verification, and payment functions during a transaction, according to a fifth embodiment of the present disclosure.

FIG. 5 is a diagram 100E illustrating an apparatus for item recognition, item verification, and payment functions during a transaction according to an example embodiment. The apparatus of FIG. 5 lacks a base. However, the apparatus is similar to the apparatus of FIG. 4 in that the frame-based element 121G-1 includes two vertical posts, each vertical post adjoined to an angled post, and each end of the angled posts affixed to a backside of touch display 110G. The apparatus still includes an integrated card reader 111G into a bottom of touch display 110G, at least two light guidance sources 121G-2, two to four cameras 121G-3, and a vertical scanner 125G.

The apparatuses discussed above for FIGS. 1, 2A-2C, 3A, 3B, 4, and 5 can be configured to adjust the position of the corresponding touch displays in any of the display orientations presented. Moreover, the apparatuses can be mounted on a wall, affixed to a pedestal, placed on a media dispenser/accepter, and/or placed on a table/desk or any countertop. Thus, the apparatuses are portable and can be relocated. Furthermore, a variety of additional peripheral devices may be interfaced to the apparatuses via wired and/or wireless connections.

FIG. 6 is a diagram 200 of a transaction terminal 210 for item recognition, item verification, and payment functions during a transaction, according to an example embodiment. The terminal 200 includes processors, a touch display 212, a frame-based element (hereinafter just "frame") 213, at least one scanner 214, a printer 215 (optional), a weigh scale 216 (optional), a media acceptor/dispenser 217 (optional), a card reader 218, and a non-transitory computer-readable storage medium 219.

Medium 219 includes executable instructions for a transaction manager 219-1 and an item tracker and recognizer 219-2 (collectively the "computer-vision item transaction manager"). The instructions when executed by processors 211 cause the processors to perform operations discussed herein and below for 219-1 and 219-2.

Terminal 210 can be configured as any of the apparatuses discussed above with FIGS. 1, 2A-2C, 3A, 3B, 4, and 5. Optionally, the terminal 210 may also include one or more of a printer 215 and/or a media acceptor/dispenser 217. For example, the apparatuses of FIGS. 1, 2A, 2B, 2C, and 4 may be interfaced to and rested on top of media acceptor/dispenser 217 or the apparatuses of FIGS. 1, 2A-C, 3A-B, 4 and 5 may be interfaced to and situated adjacent to media acceptor/dispenser 217 to form terminal 210. As another example, a small receipt printer 215 may be interfaced to and situated adjacent to any of the apparatuses of FIGS. 1, 2A-C, 3A-B, 4 and 5 to form terminal 210.

During operation of terminal 210, an operator of terminal 210 places items to be purchased within the scan area. The vertical scanner 214 and/or horizontal scanner 214 (when the base of an apparatus is a bioptic scanner 214) captures any visible barcodes for the items and reports the item codes to transaction manager 219-1. Item tracker and recognizer receives images of the items in the scan area from the cameras of the frame 213. Each portion of the images is identified as being associated with a specific unique item. The portions of the images belonging to a single item are processed to extract features based on the corresponding item's size, shape, edges, packaging, etc. Each item's features are scored, and each score is compared against ranges of scores associated with known items to determine an item identifier that corresponds to the item. Item tracker and recognizer 219-2 reports the item identifiers or codes to transaction manager 219-1, and transaction manager 219-1 presents the operator with the item details and item pricing for the items placed in the scan area through a transaction interface. If an item barcode recorded by the scanner 214 does not comport with an item code recorded for that corresponding item by item tracker and recognizer, then an alert is raised by transaction manager 219-1. This can be an indication that a barcode sticker on the packaging of the item was swapped out with a barcode for a different product, i.e., ticket switching. Alternatively, transaction manager 219-1 may disregard the scanned item barcode and use the item code provided by item tracker and recognizer 219-2 for the transaction and may present a notification in the transaction interface screens that notifies the operator that the scanned barcode was incorrect and that the correct item is listed in the item details. In a scenario in which an item was completely or partially covered by a hand of an operator and quickly removed from the scan area, item tracker and recognizer 219-2 may notify transaction manager 219-1 that an item is unaccounted for when a total recorded item count does not match a total items seen count. Transaction manager 219-1 may display an interface screen on the touch display 212 asking the customer if there was an item that the customer put back or failed to scan, and if the customer does not respond by putting the item in the scan area, transaction manager 219-1 may raise an alert to an attendant to come and audit the transaction items for the transaction.

When the transaction items are verified by transaction manager 219-1, transaction manager 219-1 displays a payment option screen for the customer to select a payment method. When the payment method is a payment card, the customer may insert the payment card into card reader 218, tap the payment card on card reader 218, or swipe the payment card through card reader 218. In an embodiment, the card reader 218 is integrated into a bottom of touch display 212, as illustrated above with apparatuses of FIGS. 1, 2A-2C, 3A, 3B, 4, and 5. When the transaction is completed, the customer can collect the items, bag them if necessary/desired, and exit the store. Optionally, transaction manager 219-1 causes printer 215 to print a transaction receipt for the customer to take before leaving the store.

In an embodiment, transaction terminal 210 is an SST, a point-of-sale (POS) terminal, or a kiosk. In an embodiment, the operator is a customer performing a self-checkout. In another embodiment, the operator is an attendant performing a customer-assisted checkout on behalf of the customer.

FIG. 7 is a diagram of a method 300 for item recognition, item verification, and payment functions during a transaction, according to an example embodiment. The software module(s) that implements the method 300 is referred to as a computer-vision item transaction module. The computer-vision item transaction module is implemented as executable instructions programmed and residing within memory and/or a non-transitory computer-readable (processor-readable) storage medium and executed by one or more processors of a device or set of devices. The processor(s) of the device that executes the computer-vision item transaction module is specifically configured and programmed to process the computer-vision item transaction module. The computer-vision item transaction module may or may not have access to one or more network connections during its processing. The network connections can be wired, wireless, or a combination thereof.

In an embodiment, the device that executes computer-vision item transaction module is terminal 210. In an embodiment, the device that executes the computer-vision item transaction module is any of the touch displays discussed above with the apparatuses of FIGS. 1, 2A-2C, 3A, 3B, 4, and 5. The touch displays can include the one or more processors.

In an embodiment, the computer-vision item transaction module is all of, or some combination of, 219-1 and/or 219-2. The computer-vision item transaction module presents another and, in some ways, an enhanced processing perspective from that which was described above for the apparatus of FIG. 1 and/or the terminal 210 of FIG. 6.

At 310, computer-vision item transaction module scans first item codes from a scan area using a scanner that is adjacent to the scan area during a transaction. Any item barcodes visible to a vertical scan window of the scanner are captured as the first item codes.

At 320, the computer-vision item transaction module obtains multiple images captured by multiple cameras of each of a plurality of items located in the scan area during the transaction. The multiple cameras may be integrated into a framed element and focused on the scan area.

At 330, the computer-vision item transaction module performs item recognition on the multiple images of each item and assigns second item codes to the items. That is, independent of the first item codes, the computer-vision item transaction module assigns item codes to each of the items within the scan area using the multiple images captured for each item within the scan area.

At 340, the computer-vision item transaction module compares the first item codes against the second item codes. This will detect when an item barcode that was scanned does not match an identified item at 330.

At 350, the computer-vision item transaction module determines whether to issue an alert based on 340. In some instances, the alert is processed to cause transaction interface screens to be presented to an operator indicating that the scanned item codes do not comport with the assigned item codes. Alternatively and/or additionally, the alert is processed to cause an attendant to be dispatched to the operator for purposes of performing an item audit for the transaction.

At 370, the computer-vision item transaction module (e.g., 310-360) is processed automatically when the items are placed in the scan area. So, as soon as items are placed in the scan area, the scanner attempts to scan first item codes and the images of the scan are used to process item recognition and assign the second item codes. In an alternative embodiment, the computer-vision item transaction module may identify the items without reading the barcodes, based on an identification of the item alone, and only reverting to the item codes when the item is not able to be identified within a predetermined level of confidence.

Current computer-vision retail solutions may be designed with cameras mounted on arm extension members around the sides and above a scan zone. This type of design hinders usability across a transaction counter because users are forced to hold items in front of the checkout kiosk before setting them down and are not able to bring them across from an input shelf or the like that is on the kiosk. In addition, many existing computer-vision checkout solutions are also dedicated, non-modular solutions that cannot be integrated onto existing checkout solutions, such as self-service checkout kiosks, without requiring a new installation, a designated space, and a completely new user experience to learn. The open frame camera support assemblies according to example embodiments of the disclosed technology and described in more detail below are modular and provide the flexibility to be integrated into existing self-checkout terminals.

Figure 8:
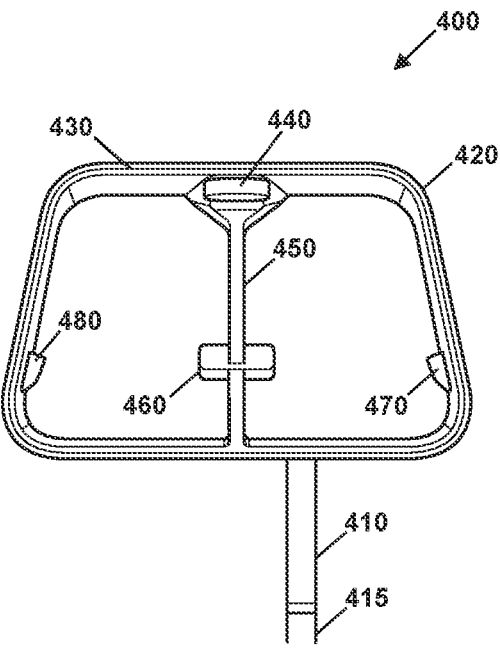
FIG. 8 is a diagram of one version of an open frame camera support assembly for use with a transaction terminal for item recognition, item verification, and payment functions during a transaction, according to a sixth embodiment of the present disclosure.

Referring now to FIG. 8, a first version of an open frame camera support assembly 400 consists of a frame 420 mounted to an arm member 410, which in turn is coupled to a vertical member 415. Arm member 410 and vertical member 415 form a bracket for supporting frame 420. The frame 420 has a preferably trapezoidal shape, with the side closest to arm member 410 longer than the opposite side (i.e., the two bases of the trapezoid). The frame 420 may have other shapes, including a rectangle, an oval, a circle, etc. A cross-member 450 extends from one side to the other of the frame 420, bisecting or substantially bisecting the interior space formed by frame 420. A first camera 440 is mounted proximal to the junction of the cross-member 450 and the frame 420 on a side of frame 420 opposite to arm member 410, and a second camera 460 is mounted on the cross-member 450, preferably closer to the side of frame 420 that is closer to arm member 410. A third camera 470 is mounted on one leg of the frame 420 and a fourth camera 480 is mounted on the other leg of the frame 420. A lighting strip 430 formed from, e.g., LEDs, may be provided on the lower (underside) edge of a periphery of the frame 420 and may be used to illuminate the items to be recognized/scanned. The direction and intensity provided by lighting strip 430 may be adjustable to enhance the view of the items by the cameras. The lighting strip 430 may emit different colors of light in order to alert or guide a user through a transaction or to enhance the contrast of the items to improve each camera sensitivity in viewing items. The lighting strip 430 may also work in synchronization with the steps of a transaction and with the associated computer vision software. For example, if an item is wrongly placed or not recognized, the lighting strip 430 may flash a predefined color, e.g., red, or the lighting strip 430 may flash green to signify that a transaction is complete (e.g., payment accepted).

Figure 9:
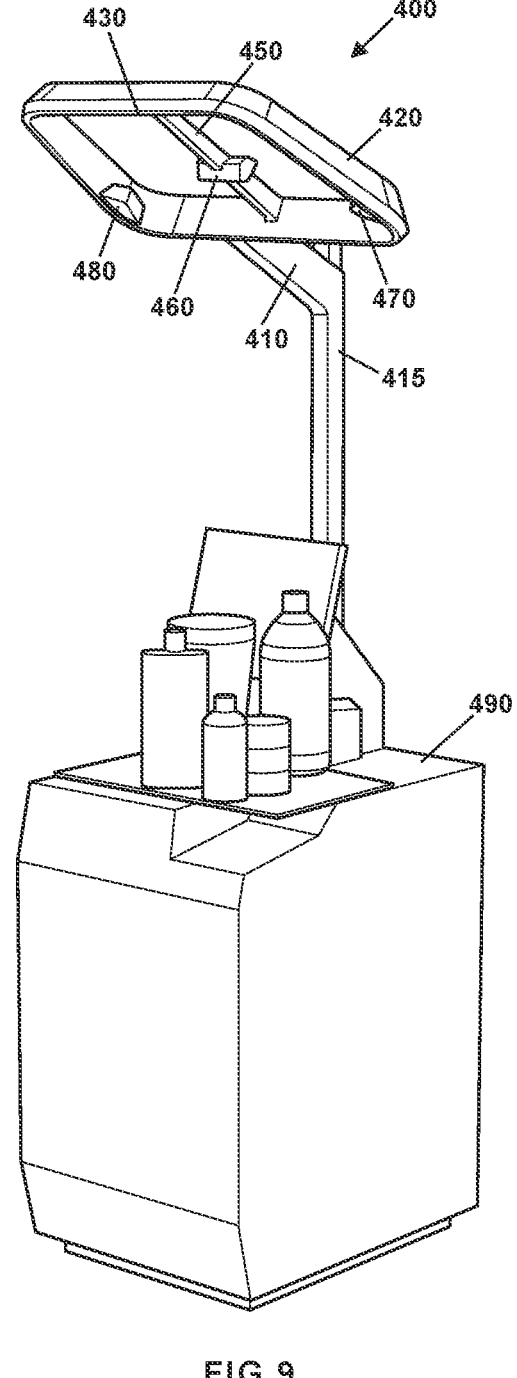
FIG. 9 is a diagram of the transaction terminal for item recognition, item verification, and payment functions during a transaction, according to the sixth embodiment of the present disclosure.

As shown in FIG. 9, the open frame camera support assembly 400 is adapted to be attached vertically via the vertical member 415 to a self-service checkout terminal 490. The vertical member 415 may be adapted to be mounted to a wall as well. The height of the frame 420 is adjustable so that the cameras 440, 460, 470, 480 and the light strip 430 can be directed downward onto a scan area surface of the self-service checkout terminal 490 where merchandise or other items can be placed for item recognition. The open frame camera support assembly 400 is preferably mounted angled upwards, as shown in FIG. 9. The cameras 440, 460, 470, 480 are mounted in a downward facing position, each angled so as to obtain an optimum view of all of the items on the surface of the self-service checkout terminal 490. In other variations, the open frame camera support assembly 400 can be mounted with the frame 420 oriented horizontally over a surface, facing downward for viewing and recognizing items below it, or vertically adjacent to a surface, facing forward for viewing and recognizing items in front of it. The open frame camera support assembly 400 provides flexibility in orientation, height adjustability, and depth positioning, which allows for optimization of depth of view of each of the cameras 440, 460, 470, 480 in order to ensure optimum item recognition and accommodates customers alone a wide range of heights. The ability to reposition the frame 420 ensures better training for machine-learning of associated computer vision programs. In some cases, not all of the cameras shown in FIGS. 8 and 9 are necessary. When all four cameras 440, 460, 470, 480 are used, camera 460 provides a top-down straight view of an items on the scan area; camera 470 and camera 480 provide side and rear views of the items from one side and the other side, respectively; and camera 440 provides top and front views of the items from the front side. The use of an overhead assembly including an open-aperture frame such as the frame 420 provides flexibility in positioning and adding cameras (e.g., inside or outside the frame 420 or on cross-member 450).

Figure 10A:
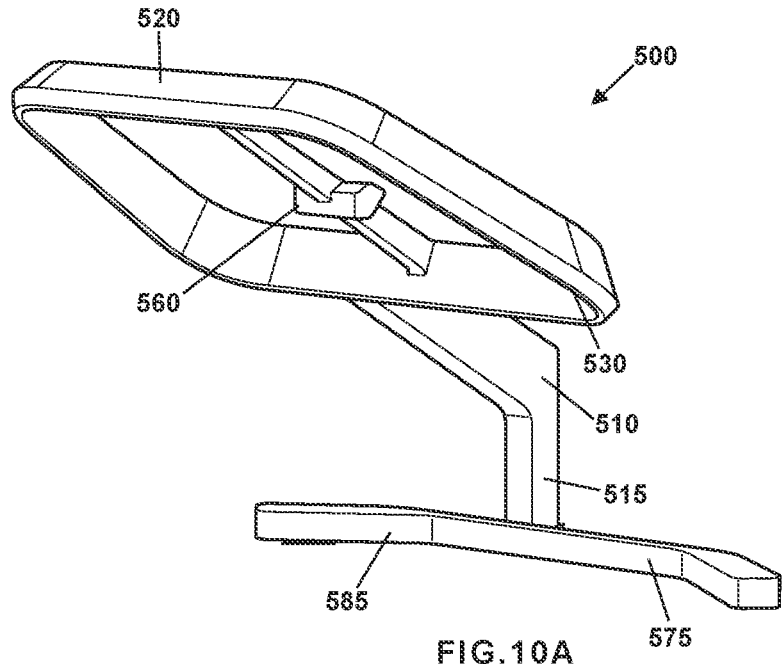
FIG. 10A is a perspective view and FIG. 10B is an underside view of another version of an open frame camera support assembly for use with a transaction terminal for item recognition, item verification, and payment functions during a transaction, according to a seventh embodiment of the present disclosure.
Figure 10B:
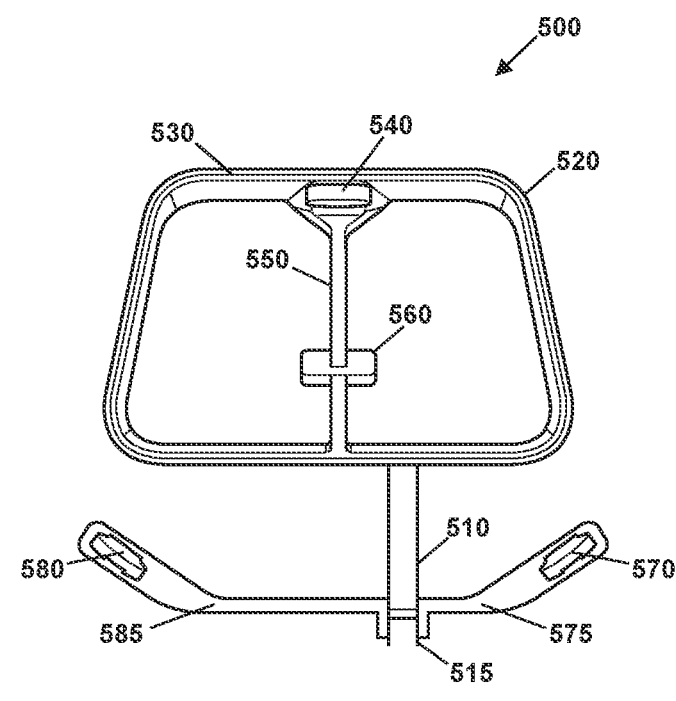

In one alternative embodiment shown in FIGS. 10A and 10B, an open frame camera support assembly 500 consists of a frame 520 mounted to an arm member 510, which in turn is coupled to a vertical member 515. Two arm extension members 575, 585 may extend outwards from vertical member 515 below frame 520 (in some cases only one of the two arm extension members is necessary). Arm member 510 and vertical member 515 form a bracket for supporting frame 520 and arm extension members 575, 585. The frame 520 has a preferably trapezoidal shape, with the side closest to arm member 510 longer than the opposite side (i.e., the two bases of the trapezoid). The frame 520 may have other shapes, including a rectangle, an oval, a circle, etc. A cross-member 550 extends from one side to the other of the frame 4520, bisecting or substantially bisecting the interior space formed by frame 520. A first camera 540 is mounted proximal to the junction of the cross-member 550 and the frame 520 on a side of frame 520 opposite to arm member 510, and a second camera 560 is mounted on the cross-member 550, preferably closer to the side of frame 520 closer to arm member 510. A third camera 570 is mounted on a lower portion of the arm 575 at an end thereof distal from vertical member 515 and a fourth camera 580 is mounted on a lower portion of the arm 585 at an end thereof distal from vertical member 515. A lighting strip 530 formed from, e.g., LEDs, may be provided on the lower (underside) edge of a periphery of the frame 520. Lighting strip 530 preferably provides the same functions as lighting strip 430 shown in FIGS. 8 and 9.

Figure 11:
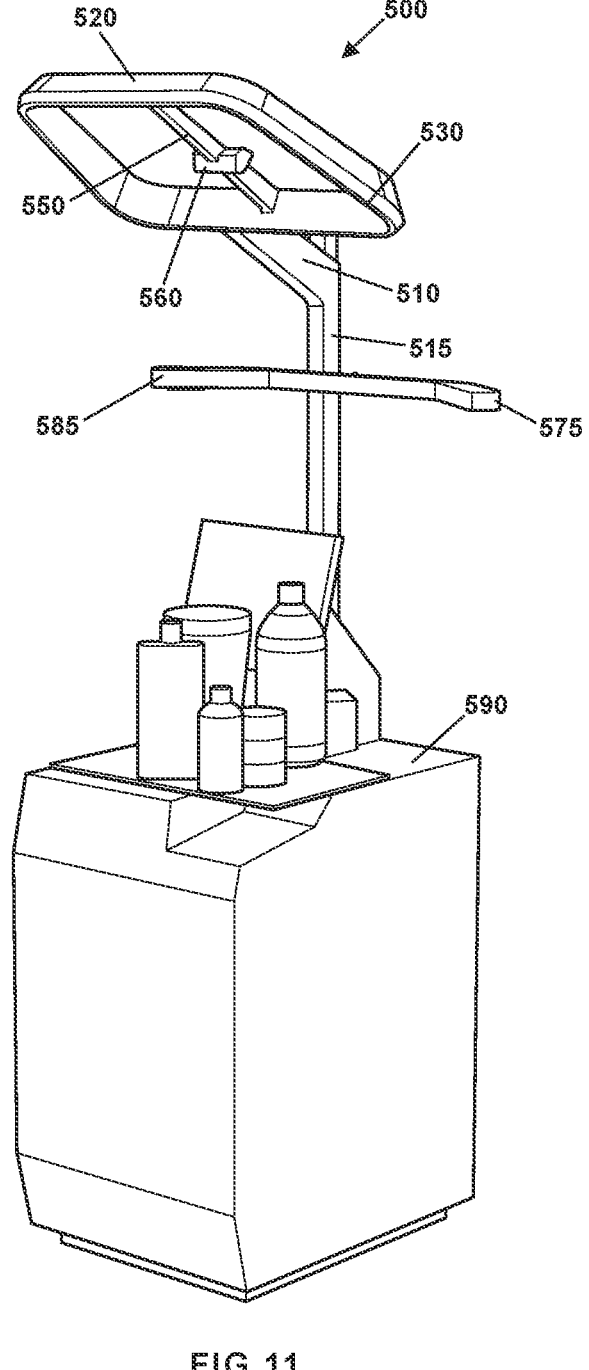
FIG. 11 is a diagram of the transaction terminal for item recognition, item verification, and payment functions during a transaction, according to the seventh embodiment of the present disclosure.

As shown in FIG. 11, the open frame camera support assembly 500 is adapted to be attached vertically via the vertical member 515 to a self-service checkout terminal 590. The vertical member 515 may be adapted to be mounted to a wall as well. The height of the frame 520 is adjustable so that the cameras 540, 560 and the light strip 430 can be directed downward onto a scan area surface of the self-service checkout terminal 590 where merchandise or other items can be placed for item recognition. The height of the arm extension members 575 and 585 may also be adjustable upwards and downwards in order to optimize the view provided by cameras 570 and 580, respectively. The cameras 540, 560, 570, 580 are mounted in a downward facing position, with each angled so as to obtain an optimum view of all of the items on the surface of the self-service checkout terminal 590.

Figure 12:
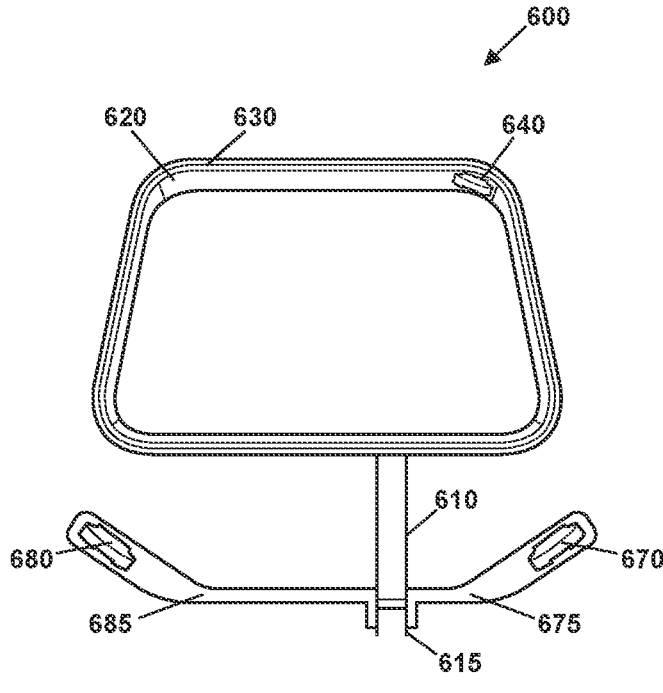
FIG. 12 is a diagram of still another version of an open frame camera support assembly for use with a transaction terminal for item recognition, item verification, and payment functions during a transaction, according to an eighth embodiment of the present disclosure.
Figure 13:
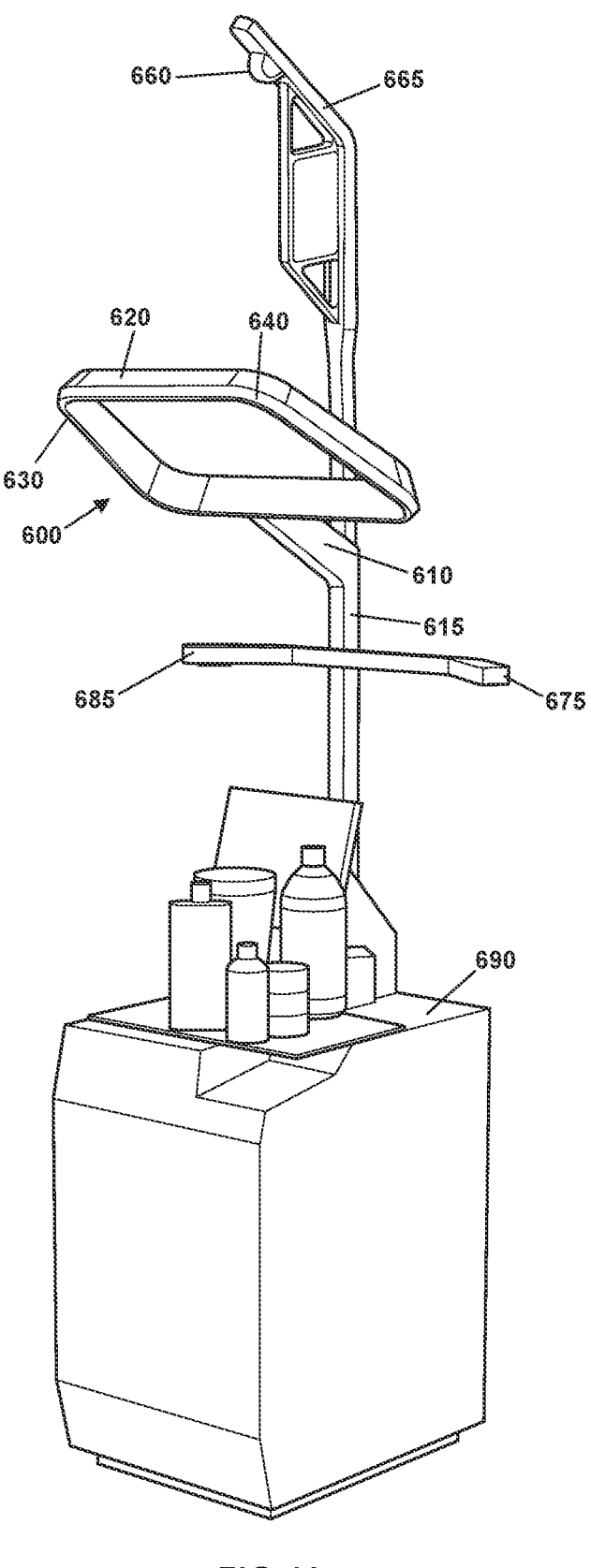
FIG. 13 is a diagram of the transaction terminal for item recognition, item verification, and payment functions during a transaction, according to the eighth embodiment of the present disclosure.

Referring now to FIGS. 12 and 13, in a different arrangement, an open frame camera support assembly 600 consists of a frame 620 mounted to an arm member 610, which in turn is coupled to a vertical member 615. Two arm extension members 675, 685 may extend outwards from vertical member 615 below frame 620 (in some cases only one of the two arm extension members is necessary). Arm member 610 and vertical member 615 form a bracket for supporting frame 620 and arm extension members 675, 685. The frame 620 has a preferably trapezoidal shape, with the side closest to arm member 610 longer than the opposite side (i.e., the two bases of the trapezoid). The frame 620 may have other shapes, including a rectangle, an oval, a circle, etc. Here, however, no cross-member is included, that is, the space within frame 620 is open. A first camera 640 is mounted to the frame 620 proximal to one corner of the frame 620 on a side of the frame 620 opposite to arm member 610. A second camera 660 is mounted close to the top of a pole 665, which may have additional functions as part of an associated self-service checkout terminal 690. A third camera 670 is mounted on a lower portion of the arm 675 at an end thereof distal from vertical member 615 and a fourth camera 680 is mounted on a lower portion of the arm 685 at an end thereof distal from vertical member 515. A lighting strip 630 formed from, e.g., LEDs, may be provided on the lower (underside) edge of a periphery of the frame 620. Lighting strip 630 preferably provides the same functions as lighting strip 430 shown in FIGS. 8 and 9. The open frame camera support assembly 600 is adapted to be attached vertically via the vertical member 615 to a pole 665 provided as part of a self-service checkout terminal 690. The height of the open frame camera support assembly 600 is preferably adjustable with respect to pole 665 so that the cameras 640, 670, 680 and the light strip 630 can be directed downward onto a scan area surface of the self-service checkout terminal 690 where merchandise or other items can be placed for item recognition. The cameras 640, 660, 670, 680 are all mounted in a downward facing position, with each angled so as to obtain an optimum view of all of the items on the surface of the self-service checkout terminal 690. In further embodiments, additional cameras can be mounted at different locations along the periphery of the frame 620 in order to provide additional views of the surface of the self-service checkout terminal 690. The pole 665 may be a tri-light pole that includes a display configured to display various transaction-related information, for example.

The locations of the various cameras provided in the embodiments shown in FIGS. 8 to 13 in relation to the associated frames 420, 520, 620 are strategically laid out to optimize usability across all heights of users and to provide an optimal camera view of all items to be recognized on the surface of the associated self-service checkout terminal. The cameras and associated lighting element of the embodiments shown in FIGS. 8 to 13 are coupled to a transaction terminal (e.g., transaction terminal 210 of FIG. 6) for operation in a manner substantially the same as described with respect to method 300 in FIG. 7.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. An open frame camera support assembly for a self-service checkout terminal incorporating a computer-vision item transaction module, comprising:
    an open frame mounted on a bracket coupled to the self-service checkout terminal, the open frame above a scan area surface of the self-service checkout terminal, the open frame having two opposing sides, the bracket consisting of an arm member and a vertical member, the arm member connected to the open frame on a first side of the two opposing sides at a first end thereof and connected to the vertical member at a second end thereof;
    a cross-member connecting the two opposing sides of the open frame at a mid-point of each of the two opposing sides; and
    a first camera mounted on the cross-member, the first camera positioned downward facing towards the scan area surface of the self-service checkout terminal, the first camera coupled to a computer-vision item transaction module of the self-service checkout terminal.

2. The open frame camera support assembly of claim 1, comprising a second camera mounted at a junction of the cross-member and a second side of the two opposing sides, the second camera positioned downward facing towards the scan area surface of the self-service checkout terminal, the second camera coupled to the computer-vision item transaction module of the self-service checkout terminal.

3. The open frame camera support assembly of claim 1, comprising a lighting strip formed from LEDs mounted along an underside periphery of the open frame.

4. The open frame camera support assembly of claim 1, comprising a third camera mounted on the open frame, the third camera positioned downward facing towards the scan area surface of the self-service checkout terminal, the third camera coupled to the computer-vision item transaction module of the self-service checkout terminal.

5. The open frame camera support assembly of claim 4, comprising a fourth camera mounted on the open frame, the fourth camera coupled to the computer-vision item transaction module of the self-service checkout terminal.

6. The open frame camera support assembly of claim 1, wherein the open frame has a shape of a trapezoid.

7. The open frame camera support assembly of claim 6, wherein the first side of the two opposing sides of the open frame is larger than the second side of the two opposing sides of the open frame.

8. The open frame camera support assembly of claim 1, comprising:

a first arm extension member mounted to the vertical member; and a third camera mounted on an underside of the first arm extension member, the third camera positioned downward facing towards the scan area surface of the self-service checkout terminal, the third camera coupled to the computer-vision item transaction module of the self-service checkout terminal.

9. The open frame camera support assembly of claim 8, comprising:

a second arm extension member mounted to the vertical member; and a fourth camera mounted on an underside of the second arm extension member, the fourth camera positioned downward facing towards the scan area surface of the self-service checkout terminal, the fourth camera coupled to the computer-vision item transaction module of the self-service checkout terminal.

10. An open frame camera support assembly for a self-service checkout terminal incorporating a computer-vision item transaction module, comprising:

an open frame mounted on a bracket coupled to the self-service checkout terminal, the open frame above a scan area surface of the self-service checkout terminal, the open frame being trapezoidal and having two opposing parallel sides, the bracket consisting of an arm member and a vertical member, the arm member connected to the open frame on a first side of the two opposing parallel sides at a first end thereof and connected to the vertical member at a second end thereof;

a cross-member connecting the two opposing parallel sides of the open frame at a mid-point of each of the two opposing parallel sides; and a first camera mounted on the cross-member, the first camera positioned downward facing towards the scan area surface of the self-service checkout terminal, the first camera coupled to a computer-vision item transaction module of the self-service checkout terminal.

11. The open frame camera support assembly of claim 10, comprising:

a second camera mounted at a junction of the cross-member and a second side of the two opposing parallel sides, the second camera positioned downward facing towards the scan area surface of the self-service checkout terminal, the second camera coupled to the computer-vision item transaction module of the self-service checkout terminal.

12. The open frame camera support assembly of claim 11, comprising a third camera mounted on the open frame, the third camera positioned downward facing towards the scan area surface of the self-service checkout terminal, the third camera coupled to the computer-vision item transaction module of the self-service checkout terminal.

13. The open frame camera support assembly of claim 12, comprising a fourth camera mounted on the open frame, the fourth camera coupled to the computer-vision item transaction module of the self-service checkout terminal.

14. The open frame camera support assembly of claim 11, comprising:

an arm extension member mounted to the vertical member; and a third camera mounted on an underside of the arm extension member, the third camera positioned downward facing towards the scan area surface of the self-service checkout terminal, the third camera coupled to the computer-vision item transaction module of the self-service checkout terminal.

15. The open frame camera support assembly of claim 10, comprising a lighting strip formed from LEDs mounted along an underside periphery of the open frame.

16. An open frame camera support assembly for a self-service checkout terminal incorporating a computer-vision item transaction module, comprising:

a vertical pole having a first end mounted to the self-service checkout terminal and a second end;

an open frame mounted to a first end of an arm member, with a second end of the arm member connected to a point on the vertical pole between the first and the second end so that the open frame is positioned above a scan area surface of the self-service checkout terminal, the open frame formed from only four sides forming a closed loop, including a first pair of opposing sides and a second pair of opposing sides, wherein the arm member is connected to the open frame only on a first side of the first pair of opposing sides; and a first camera mounted on the open frame, the first camera positioned downward facing towards the scan area surface of the self-service checkout terminal, the first camera coupled to a computer-vision item transaction module of the self-service checkout terminal.

17. The open frame camera support assembly of claim 16, comprising a second camera mounted adjacent to the second end of the vertical pole, the second camera positioned downward facing towards the scan area surface of the self-service checkout terminal, the second camera coupled to the computer-vision item transaction module of the self-service checkout terminal.

18. The open frame camera support assembly of claim 16, comprising a lighting strip formed from LEDs mounted along an underside periphery of the open frame.

19. The open frame camera support assembly of claim 16, wherein the open frame has a shape of a trapezoid; and wherein the first side of the first pair of opposing sides of the open frame is larger than a second side of the first pair of opposing sides of the open frame.

20. The open frame camera support assembly of claim 16, comprising:

a first arm extension member mounted to the vertical pole;

a third camera mounted on an underside of the first arm extension member, the third camera positioned downward facing towards the scan area surface of the self-service checkout terminal, the third camera coupled to the computer-vision item transaction module of the self-service checkout terminal;

a second arm extension member mounted to the vertical pole; and a fourth camera mounted on an underside of the second arm extension member, the fourth camera positioned downward facing towards the scan area surface of the self-service checkout terminal, the fourth camera coupled to the computer-vision item transaction module of the self-service checkout terminal.

\* \* \* \* \*